US011655954B2

(12) United States Patent
Konishi

(10) Patent No.: US 11,655,954 B2
(45) Date of Patent: May 23, 2023

(54) REFLECTOR AND IRRADIATION DEVICE

(71) Applicant: DENKA COMPANY LIMITED, Tokyo (JP)

(72) Inventor: Masahiro Konishi, Omuta (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 17/427,177

(22) PCT Filed: Jan. 28, 2020

(86) PCT No.: PCT/JP2020/002915
§ 371 (c)(1),
(2) Date: Jul. 30, 2021

(87) PCT Pub. No.: WO2020/162260
PCT Pub. Date: Aug. 13, 2020

(65) Prior Publication Data
US 2022/0146071 A1 May 12, 2022

(30) Foreign Application Priority Data
Feb. 4, 2019 (JP) .............. JP2019-017775

(51) Int. Cl.
*F21S 41/176* (2018.01)
*F21S 41/675* (2018.01)
*F21S 41/365* (2018.01)
*F21S 41/37* (2018.01)
*C09K 11/77* (2006.01)
*B60Q 1/06* (2006.01)
*F21W 102/30* (2018.01)

(52) U.S. Cl.
CPC .............. *F21S 41/675* (2018.01); *B60Q 1/06* (2013.01); *C09K 11/77348* (2021.01); *F21S 41/176* (2018.01); *F21S 41/365* (2018.01); *F21S 41/37* (2018.01); *F21W 2102/30* (2018.01)

(58) Field of Classification Search
CPC ........ F21S 41/176; F21S 41/365; F21S 41/37; F21S 41/675
See application file for complete search history.

(56) References Cited

U.S. PATENT DOCUMENTS

| 2009/0103293 A1 | 4/2009 | Harbers et al. |
| 2010/0033948 A1 | 2/2010 | Harbers et al. |
| 2015/0176792 A1 | 6/2015 | Hager et al. |

(Continued)

FOREIGN PATENT DOCUMENTS

| DE | 10 2014 208 660 A1 | 11/2015 |
| JP | 2011-099995 A | 5/2011 |

(Continued)

OTHER PUBLICATIONS

Apr. 7, 2020 International Search Report issued in International Patent Application No. PCT/JP2020/002915.
(Continued)

*Primary Examiner* — Sean P Gramling
(74) *Attorney, Agent, or Firm* — Oliff PLC

(57) ABSTRACT

A reflector includes a reflector body that reflects light emitted from a light source and a phosphor layer that is provided on the reflector body and includes a phosphor excited by the light emitted from the light source.

8 Claims, 9 Drawing Sheets

(56) References Cited

U.S. PATENT DOCUMENTS

| | | | |
|---|---|---|---|
| 2015/0210207 A1 | 7/2015 | Mori et al. | |
| 2016/0109627 A1* | 4/2016 | Yamanaka | F21S 41/285 362/84 |
| 2017/0138556 A1* | 5/2017 | Hager | F21S 41/657 |

FOREIGN PATENT DOCUMENTS

| | | |
|---|---|---|
| JP | 2013-207241 A | 10/2013 |
| JP | 2014-123458 A | 7/2014 |
| JP | 2015-137071 A | 7/2015 |

OTHER PUBLICATIONS

Feb. 9, 2022 Extended European Search Report issued in European Patent Application No. 20752621.1.

\* cited by examiner

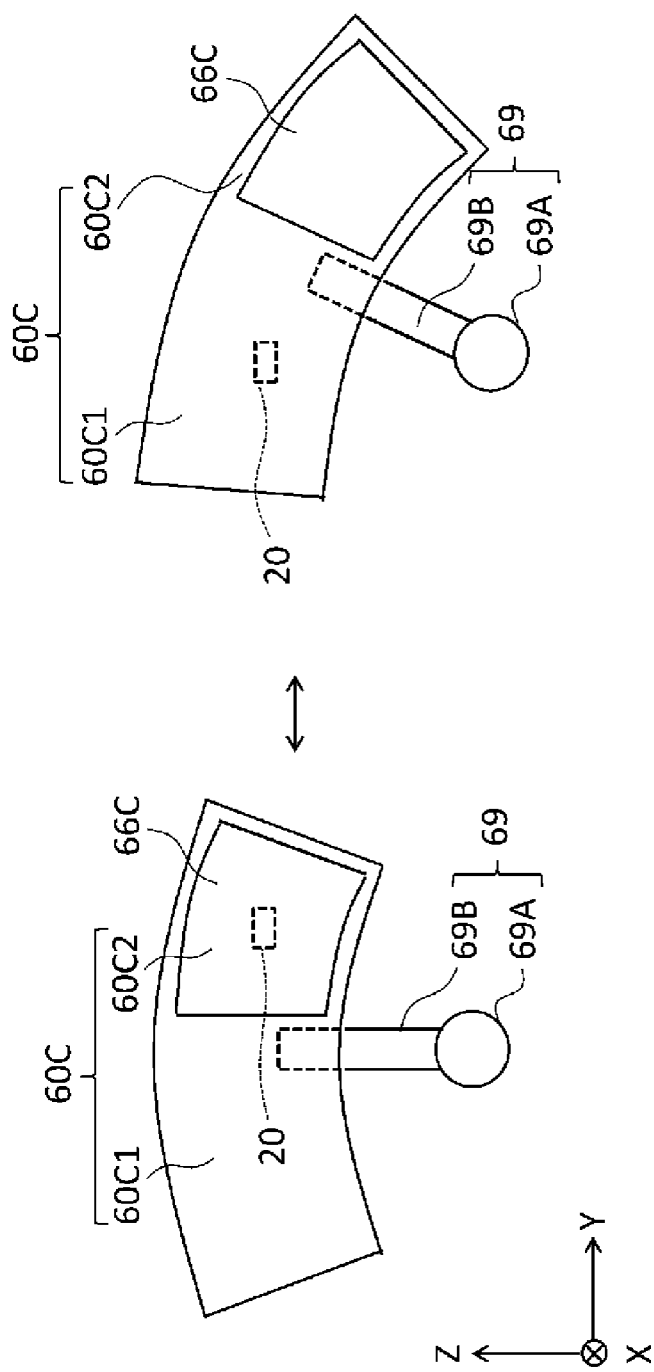

REFLECTOR AND IRRADIATION DEVICE

TECHNICAL FIELD

The present invention relates to a reflector and an irradiation device.

BACKGROUND ART

For example, a technique of reflecting the light emitted from a light source using a reflector is known. As one of such a technique, for example, Patent Document 1 discloses a fog lamp 14 for a vehicle including a light source and a reflector which is a reflecting surface portion surrounding the light source. It is described that this reflector has a cup-like shape having an opening at a front, and has a reflecting surface that has been plated or painted, on an inner surface. It is also described that a basic function of the reflector is to reflect light emitted from the light source at a predetermined angle. Further, it is described that the reflector is made of, for example, an integrally injection-molded resin material.

RELATED DOCUMENT

Patent Document

[Patent Document 1] Japanese Unexamined Patent Publication No. 2015-137071

SUMMARY OF THE INVENTION

Technical Problem

However, the reflector disclosed in Patent Document 1 cannot change a wavelength of reflected light when the light emitted from the light source is reflected.

An object of the present invention is to provide a reflector capable of reflecting light having a wavelength different from that of light emitted from a light source.

Solution to Problem

A reflector according to a first aspect of the present invention includes a reflector body that reflects light emitted from a light source and a phosphor layer that is provided on the reflector body and includes a phosphor excited by the light emitted from the light source.

In the reflector according to the first aspect, in the reflector according to a second aspect of the present invention, the phosphor is at least one selected from the group consisting of an α-type sialon phosphor containing Eu, a β-type sialon phosphor containing Eu, a CASN phosphor containing Eu, and a SCASN phosphor containing Eu.

An irradiation device according to the first aspect of the present invention includes the reflector according to the first aspect and the second aspect; and a light source emits light which is reflected by the reflector and excites the phosphor.

In the irradiation device according the first aspect, the irradiation device according to the second aspect of the present invention, further includes another reflector that further reflects the light reflected by the reflector or reflects the light emitted from the light source toward the reflector.

In the irradiation device according to the second aspect, in the irradiation device according to a third aspect of the present invention, the other reflector is the reflector that further reflects the light reflected by the reflector, and an area of a light reflecting surface in the reflector is smaller than an area of a light reflecting surface in the other reflector.

An irradiation device according to a fourth aspect of the present invention includes: a light source; a first reflector that is disposed at a predetermined reflection position and reflects the light emitted from the light source; a second reflector that is disposed at the reflection position and reflects the light emitted from the light source; and a moving portion that moves the first reflector and the second reflector and is capable of switching between a first state in which one of the first reflector and the second reflector is disposed at the reflection position and the other is disposed at a non-reflection position different from the reflection position and a second state in which the one reflector is disposed at the non-reflection position and the other reflector is disposed at the reflection position, in which the first reflector includes a first phosphor layer containing a first phosphor excited by the light emitted from the light source, and the second reflector includes a second phosphor layer containing a second phosphor which is excited by the light emitted from the light source and has an emission peak wavelength of excitation light different from an emission peak wavelength of excitation light of the first phosphor.

An irradiation device according to a fifth aspect of the present invention includes: a light source; a first reflector that is disposed at a predetermined reflection position and reflects the light emitted from the light source; a second reflector that is disposed at the reflection position and reflects the light emitted from the light source; and a moving portion that moves the first reflector and the second reflector and is capable of switching between a first state in which one of the first reflector and the second reflector is disposed at the reflection position and the other is disposed at a non-reflection position different from the reflection position and a second state in which the one reflector is disposed at the non-reflection position and the other reflector is disposed at the reflection position, in which only one of the first reflector and the second reflector includes a phosphor layer containing a phosphor excited by the light emitted from the light source.

An irradiation device according to a sixth aspect of the present invention includes: a light source; a first reflector that is disposed at a predetermined reflection position and reflects the light emitted from the light source; a second reflector that is disposed at the reflection position and reflects the light emitted from the light source; and a moving portion that moves the first reflector and the second reflector and is capable of switching between a first state in which one of the first reflector and the second reflector is disposed at the reflection position and the other is disposed at a non-reflection position different from the reflection position and a second state in which the one reflector is disposed at the non-reflection position and the other reflector is disposed at the reflection position, in which only one of the first reflector and the second reflector includes a phosphor layer containing a phosphor excited by the light emitted from the light source, one of the first reflector and the second reflector includes the phosphor layer containing a phosphor excited by the light emitted from the light source to thereby the reflect light emitted from the light source by shifting a wavelength of the light to a wavelength on a wavelength side of a light emission color of the phosphor, and the other of the first reflector and the second reflector reflects light emitted from the light source without shifting a wavelength of the light.

In the irradiation device according to the sixth aspect, in the irradiation device according to a seventh aspect of the present invention, the phosphor shifts the wavelength of the light emitted from the light source to a wavelength longer than the wavelength of the light.

In the irradiation device according to the seventh aspect, in the irradiation device according to an eighth aspect of the present invention, which is used as a headlamp of a vehicle, in the first state, one having the phosphor layer among the first reflector and the second reflector is disposed at the non-reflection position, in the second state, one having the phosphor layer among the first reflector and the second reflector is disposed at the reflection position, the first state is used during normal time when no fog occurs in a traveling space, and the second state is used during abnormal time when fog occurs in a traveling space.

In the irradiation device according to the fourth to eighth aspects, in the irradiation device according to a ninth aspect of the present invention, the first reflector includes a first reflection portion that reflects the light emitted from the light source, the second reflector includes a second reflection portion that reflects the light emitted from the light source, and the first reflection portion and the second reflection portion are each configured of different parts of a reflecting body that reflects the light emitted from the light source.

In the irradiation device according to the ninth aspect, in the irradiation device according to a tenth aspect of the present invention, the first reflector and the second reflector are disposed side by side by having reflecting surfaces thereof formed on the same surface of the reflecting body, and the moving portion switches between the first state and the second state by causing the reflecting body to reciprocate along a linear direction in which the first reflector and the second reflector are aligned.

In the irradiation device according to the ninth aspect, in the irradiation device according to an eleventh aspect of the present invention, the first reflector and the second reflector are disposed side by side by having reflecting surfaces thereof formed on the same surface of the reflecting body, and the moving portion switches between the first state and the second state by rotating the reflecting body to reciprocate along a circumferential direction in which the first reflector and the second reflector are aligned.

Advantageous Effects of Invention

Reflectors according to the first aspect and the second aspect of the present invention are capable of reflecting light having a wavelength different from that of light emitted from a light source.

In addition, the irradiation devices according to the first to eleventh aspects of the present invention are capable of performing irradiation with light having a wavelength different from that of light emitted from a light source.

BRIEF DESCRIPTION OF THE DRAWINGS

FIG. 7B shows a view of the primary reflector and the light source of the irradiation device of the fourth modification example as viewed from upstream side in an irradiation direction.

DESCRIPTION OF EMBODIMENTS

<Overview>

Figure 1:
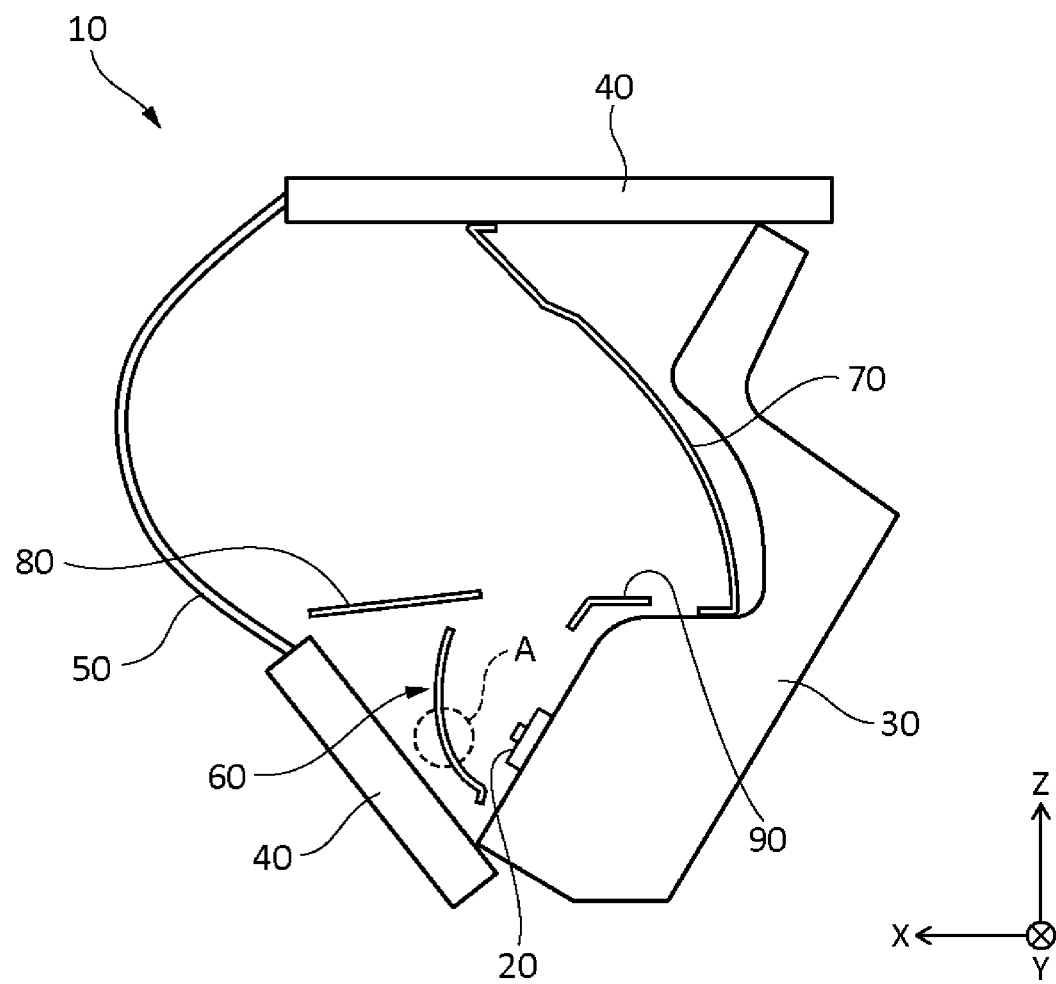
FIG. 1 shows a schematic view of an irradiation device of the present embodiment.

Hereinafter, the functions and configurations of the irradiation device 10 (see FIG. 1) of the present embodiment will be described. Next, an irradiation operation of an irradiation device 10 of the present embodiment will be described. Next, an effect of the present embodiment will be described. In all the drawings referred to in the following description, similar components are designated by the same reference numerals, and the description thereof will not be repeated.

Function and Configuration of Irradiation Device of Present Embodiment

Figure 2:
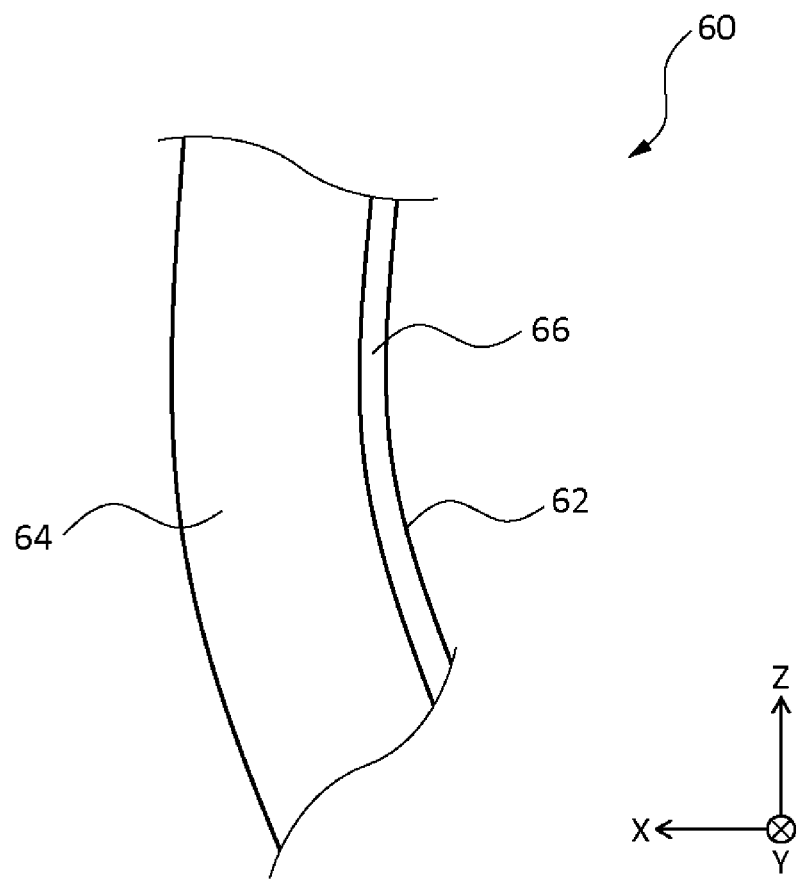
FIG. 2 shows an enlarged view of a portion surrounded by a broken line A in FIG. 1.
Figure 3:
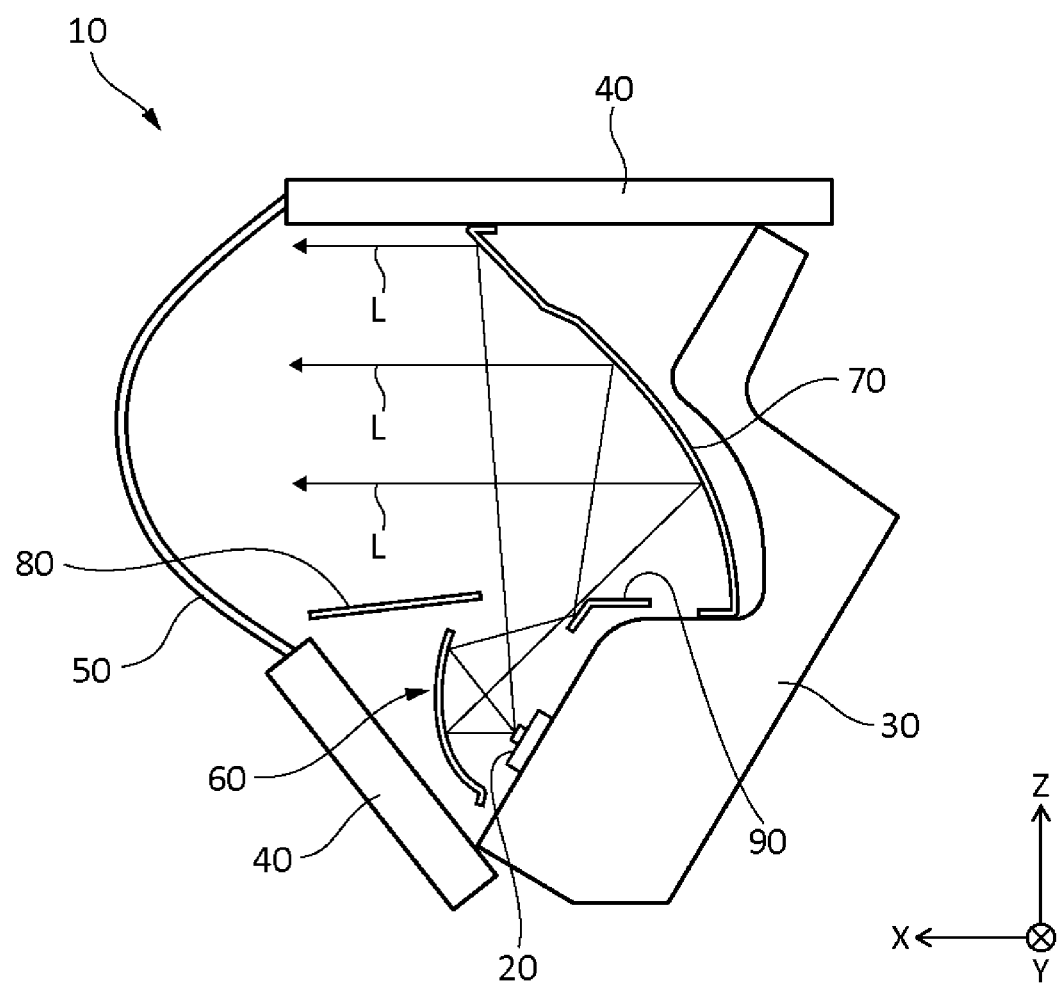
FIG. 3 shows a schematic view for explaining an irradiation operation of the irradiation device of the present embodiment.

Hereinafter, the irradiation device 10 of the present embodiment will be described with reference to FIGS. 1 to 3. FIG. 1 shows a schematic view of the irradiation device 10 of the present embodiment. FIG. 2 shows an enlarged view of a portion (a part of a primary reflector 60 to be described later) surrounded by a broken line A in FIG. 1. FIG. 3 shows a schematic view for explaining an irradiation operation of the irradiation device 10 of the present embodiment. FIGS. 1 to 3 show vertical sectional views with respect to an irradiation direction (X direction in the drawings) of light L emitted from the irradiation device 10. In addition, a width direction of the irradiation device 10 is a Y direction, and a height direction is a Z direction.

The irradiation device 10 of the present embodiment has a function of reflecting the light L (see FIG. 3) emitted from a light source 20 with the primary reflector 60 and a secondary reflector 70 and performing irradiation with the light L toward the outside. As an example, the irradiation device 10 of the present embodiment can be applied to a fog lamp for a vehicle (not shown in the drawings), a headlamp for a vehicle, indoor lighting, outdoor lighting, and other devices for irradiation with light.

As shown in FIGS. 1 and 3, the irradiation device 10 of the present embodiment includes the light source 20, a support base 30, a housing 40, a cover member 50, the primary reflector 60 (an example of a reflector), a secondary reflector 70 (an example of another reflector), a finisher 80, and a shade 90.

[Light Source and Support Base]

The light source 20 has a function of emitting the light L reflected by the primary reflector 60 and the secondary reflector 70. As an example, the light source 20 is an LED light source that emits light by a light emitting diode (so-called LED).

The light source 20 is supported by the support base 30 as shown in FIGS. 1 and 3. Therefore, the support base 30 has a function of supporting the light source 20. In addition to the above functions, the support base 30 also has a function as a heat sink that dissipates heat generated by the light source 20 when the light L is emitted.

[Housing]

The housing 40 has a function of supporting such that the support base 30, the cover member 50, the primary reflector 60, the secondary reflector 70, the finisher 80, and the shade 90 (hereinafter, objects to be supported) are located at a predetermined position in predetermined postures, respectively (see FIGS. 1 and 3). For example, in a case where the irradiation device 10 of the present embodiment is a fog lamp, the housing 40 can be attached to a vehicle (not shown in the drawings) while supporting the objects to be supported.

[Cover Member]

The cover member 50 has a function of forming a closed space for housing the light source 20, the primary reflector 60, the secondary reflector 70, the finisher 80, and the shade 90, together with the support base 30 and the housing 40. Further, the cover member 50 has a function of transmitting the light L which has been emitted from the light source 20 and then reflected by the secondary reflector 70 from the inside of the closed space to the outside. Therefore, the cover member 50 is a transparent member capable of transmitting the light L.

[Primary Reflector]

The primary reflector 60 has a function of reflecting the light L emitted from the light source 20 (see FIG. 3). Specifically, the primary reflector 60 has a function of converting a wavelength of the light L emitted from the light source 20 and directly incident and then reflecting the light L whose wavelength has been converted toward the secondary reflector 70.

The primary reflector 60 is, for example, an elliptical reflector. As shown in FIGS. 1 and 3, the primary reflector 60 is disposed with a posture in which a concave surface 62 (see FIG. 2) side faces the light source 20.

As shown in FIG. 2, the primary reflector 60 includes a reflector body 64 and a phosphor layer 66. The phosphor layer 66 is a thin layer provided on the concave surface of the reflector body 64. As an example, the phosphor layer 66 covers the concave surface of the reflector body 64 over the entire concave surface.

As an example, the phosphor layer 66 of the present embodiment is configured to include a phosphor and a binder, which will be described later. The phosphor contained in the phosphor layer 66 is formed of fine particles that are held in a state of being dispersed in the binder, and has a property of being excited by the light L emitted from the light source 20 to emit fluorescence.

(Specific Example of Phosphor)

Here, the phosphor contained in the phosphor layer 66 of the present embodiment is, for example, at least one selected from the group consisting of an α-type sialon phosphor containing Eu, a β-type sialon phosphor containing Eu, a CASN phosphor containing Eu, and a SCASN phosphor containing Eu.

An α-type sialon phosphor containing Eu is represented by a general formula: $M_xEu_ySi_{12-(m+n)}Al_{(m+n)}O_nN_{16-n}$. In the general formula, M is one or more elements containing at least Ca, selected from the group consisting of Li, Mg, Ca, Y, and lanthanide elements (excluding La and Ce), and when the valence of M is a, ax+2y=m, x is $0<x\le 1.5$, $0.3\le m<4.5$, and $0<n<2.25$.

A β-type sialon phosphor containing Eu is a phosphor in which divalent europium ($Eu^{2+}$) is solid-dissolved as a light emitting center in β-type sialon represented by a general formula: $Si_{6-z}Al_zO_zN_{8-z}$ (z=0.005 to 1).

Further, examples of a nitride phosphor include a CASN phosphor containing Eu and a SCASN phosphor containing Eu.

The CASN phosphor containing Eu (an example of the nitride phosphor) refers to, for example, a red phosphor represented by a formula $CaAlSiN_3:Eu^{2+}$, using $Eu^{2+}$ as an activator, and having a crystal made of alkaline earth silicate as a base. In the definition of the CASN phosphor containing Eu in the present specification, the SCASN phosphor containing Eu is excluded.

The SCASN phosphor containing Eu (an example of the nitride phosphor) refers to, for example, a red phosphor represented by a formula $(Sr, Ca)AlSiN_3:Eu^{2+}$, using $Eu^{2+}$ as an activator, and having a crystal made of alkaline earth silicate as a base.

As described above, the phosphor has been described using a plurality of specific examples, but as long as the phosphor excites visible light, the phosphor included in the technical scope of the present invention may be a phosphor other than the specific examples described above.

[Secondary Reflector]

The secondary reflector 70 further reflects the light L reflected by the primary reflector 60, that is, has a function of indirectly reflecting the light L emitted from the light source 20 and a function of directly reflecting a part of the light L emitted from the light source 20 (see FIG. 3). In this case, the light reflected by the secondary reflector 70 travels toward the cover member 50.

The secondary reflector 70 is, for example, a parabolic reflector. As shown in FIGS. 1 and 3, the secondary reflector 70 is disposed with a posture in which a concave surface side faces the light source 20 and the primary reflector 60. An area of a light L-reflecting surface in the secondary reflector 70 is, for example, larger than an area of the light L-reflecting surface in the primary reflector 60. From another point of view, the area of the light L-reflecting surface in the primary reflector 60 is smaller than the area of the light L-reflecting surface in the secondary reflector 70.

[Finisher]

As shown in FIG. 3, the finisher 80 is disposed between an optical path of the light L reflected by the secondary reflector 70 and the primary reflector 60 (below the optical path and above the primary reflector 60 in the height direction). The finisher 80 has a function of blocking the passage of a part of the light L emitted from the light source 20 such that light L that is not reflected by the secondary reflector 70 does not enter the light L that is finally reflected by the secondary reflector 70 and passes through the cover member 50 (light L with which the irradiation device 10 irradiates to the outside).

[Shade]

As shown in FIG. 3, the shade 90 is disposed between the optical path of the light L reflected by the secondary reflector 70 and the light source 20 (below the optical path and above the light source 20 in the height direction). The shade 90 has a function of determining a lower limit of an arrival position in the secondary reflector 70 (position on a lower side in the height direction) of the light L incident on the secondary reflector 70, among the light L emitted from the light source 20 and the light L reflected by the primary reflector 60. The shade 90 also has a function of further reflecting the light L reflected by the primary reflector 60. The light L reflected by the shade 90 is incident on the secondary reflector 70 and reflected by the secondary reflector 70.

The above is the description of the function and configuration of the irradiation device 10 of the present embodiment.

Irradiation Operation of Irradiation Device of Present Embodiment

Next, an irradiation operation of the irradiation device 10 of the present embodiment will be described with reference to FIG. 3.

First, when the operation switch (not shown in the drawings) for operating the light source 20 is turned on, a power supply from an external power source (not shown in the drawings) to the light source 20 is started, and the light L is emitted from the light source 20. In this case, the light L emitted from the light source 20 is hemispherically emitted toward the opposite side of the support base 30 with the light source 20 therebetween. Hereinafter, the behavior of the light L will be described separately according to the traveling direction of the emitted light L.

Apart of the light L emitted from the light source 20 is directly incident on the secondary reflector 70. Next, the light L is reflected by the secondary reflector 70, travels along the irradiation direction (X direction), and passes through the cover member 50. In this case, since the light L passing through the cover member 50 is reflected only by the secondary reflector 70, the wavelength of the light L passing through the cover member 50 remains the same as the wavelength of the light L when emitted from the light source 20.

Also, a part of the light L emitted from the light source 20 is incident on the primary reflector 60. In this case, the light L is first incident on the phosphor layer 66 (see FIG. 2). Moreover, when the light L collides with the phosphor dispersed in the phosphor layer 66, the phosphor excites and emits excitation light. Along with this, a part of the energy of the light L is used for exciting the phosphor, so that a part of the energy of the light L is lost. As a result, the wavelength of the light L is converted (wavelength conversion is performed). Specifically, the wavelength of the light L shifts to the wavelength of the excitation light emitted by the excitation of the phosphor. For example, in a case where the light L emitted from the light source 20 is emitted as white light and the phosphor layer 66 contains a red phosphor (CASN phosphor), the correlated color temperature of the light L becomes low. Next, the light L whose wavelength has been converted is reflected by the concave surface (see FIG. 2) of the reflector body 64. Next, a part of the reflected light L passes through the phosphor layer 66 and is incident on the secondary reflector 70. Next, the light L incident on the secondary reflector 70 is reflected by the secondary reflector 70, travels along the irradiation direction (X direction), and passes through the cover member 50. In this case, since the wavelength of the light L passing through the cover member 50 is converted with the primary reflector 60, the wavelength of the light L passing through the cover member 50 shifts from the wavelength of the light L when emitted from the light source 20 to the wavelength of the excitation light emitted by the excitation of the phosphor.

A remaining part of the light L reflected by the concave surface of the reflector body 64 then passes through the phosphor layer 66 and is incident on the shade 90, is further reflected by the shade 90, and then is incident on the secondary reflector 70. In this case, the light L reflected by the secondary reflector 70 and passing through the cover member 50 does not have a wavelength converted by the shade 90. In this case, since the wavelength of the light L passing through the cover member 50 shifts from the wavelength of the light L when emitted from the light source 20 to the wavelength of the excitation light emitted by the excitation of the phosphor, by the amount of wavelength conversion performed by the primary reflector 60.

Further, a part of the light L emitted from the light source 20 is incident on the finisher 80 without directly incident on the primary reflector 60 and the secondary reflector 70. The light L incident on the finisher 80 is blocked from traveling by the finisher 80. The light L whose progress is blocked by the finisher 80 is reflected by the finisher 80 and then finally reflected by the secondary reflector 70, and travels along the irradiation direction (X direction) to pass through the cover member 50. In this case, the light L passing through the cover member 50 is mixed light of the light L reflected by the primary reflector 60 (light L whose wavelength has been converted) and the light L not reflected by the primary reflector 60 (light L having the same wavelength as the wavelength of light L emitted from the light source 20).

As described above, the light L emitted from the light source 20 (the light L emitted from the light source 20 in a hemispherical shape) passes through the cover member 50 as a result of passing through the plurality of optical paths as described above, and forms a bundle of the light L together with the fluorescence emitted from the phosphor to be used for irradiation of the irradiation device 10. That is, in the irradiation device 10 of the present embodiment, the bundle of the light L when emitted from the light source 20 is used for irradiation as a bundle of the light L including the light L having the wavelength when emitted from the light source 20 and the excitation light emitted by the excitation of the phosphor of the phosphor layer 66 of the primary reflector 60. From another point of view, the wavelength of the light L emitted from the light source 20 is affected by the wavelength of the excitation light emitted by the excitation of the phosphor of the phosphor layer 66 of the primary reflector 60, and shifts to the wavelength side of the excitation light.

Then, when the operation switch for operating the light source 20 is turned off, the power supply from the external power source to the light source 20 is cut off, the light source 20 stops emitting the light L, and the irradiation operation of the irradiation device 10 ends.

The above is the description of the irradiation operation of the irradiation device 10 of the present embodiment.

Effect of Present Embodiment

Next, the effect of the present embodiment will be described.

[First Effect]

The primary reflector 60 of the present embodiment is provided with the phosphor layer 66 containing a phosphor that excites the light L on a reflecting surface (that is, an incident surface) of the light L in the reflector body 64. Therefore, the light L incident by the light source 20 gives a part of energy to the phosphor (used to excite the phosphor) when passing through the phosphor layer 66 before and after being reflected by the reflector body 64, to be incident on the secondary reflector 70.

Therefore, the primary reflector 60 of the present embodiment can convert the wavelength of the incident light L and reflect the incident light L. In other words, the primary reflector 60 of the present embodiment can reflect the light L having a wavelength different from that of the light L emitted from the light source 20. Along with this, the irradiation device 10 of the present embodiment can perform irradiation with the light L having a wavelength different from that of the light L emitted from the light source 20.

[Second Effect]

In a case of the present embodiment, the phosphor contained in the phosphor layer 66 is at least one selected from the group consisting of an α-type sialon phosphor containing Eu, a β-type sialon phosphor containing Eu, a CASN phosphor containing Eu, and a SCASN phosphor containing Eu. Therefore, in the primary reflector 60 of the present embodiment, in a case where the light L emitted from the light source 20 is, for example, white light L, white light L is converted to light L such as yellowish or reddish which has a lower correlated color temperature than the white light L and to be reflected.

Therefore, the primary reflector 60 of the present embodiment can shift the light L emitted from the light source 20 to the wavelength side of the light emission color of the phosphor of the phosphor layer 66 of the primary reflector 60. Along with this, the irradiation device 10 of the present embodiment can perform an irradiation with the light L emitted from the light source 20 by shifting to the wavelength side of the light emission color of the phosphor of the phosphor layer 66.

[Third Effect]

For example, a primary reflector (not shown in the drawings) known as a related art and an irradiation device (not shown in the drawings) including the primary reflector differ from a case on the present embodiment only in that, the primary reflector includes the reflector body 64 (see FIG. 2) of the present embodiment.

That is, it can be said that the present embodiment can achieve the above-mentioned first and second effects by providing a thin film of the phosphor layer 66 on the concave surface of the reflector body 64 with respect to the related art.

Therefore, in the case of the present embodiment, it is not necessary to change the layout of each component of the related art in order to achieve the above-mentioned first and second effects.

[Fourth Effect]

The irradiation device 10 of the present embodiment includes the primary reflector 60 that directly reflects the light L emitted from the light source 20 and the secondary reflector 70 that indirectly reflects the light L emitted from the light source 20, that is, further reflects the light L reflected by the primary reflector 60 (see FIGS. 1 and 3). In addition, the area of the light L-reflecting surface in the primary reflector 60 is smaller than the area of the light L-reflecting surface in the secondary reflector 70 (see FIG. 3).

Here, for example, even in a form in which the primary reflector 60 is not provided with the phosphor layer 66 and the secondary reflector 70 is provided with the phosphor layer 66 (not shown in the drawings, hereinafter referred to as the reverse form), the first to third effects can be achieved. However, in the case of the reverse form described above, it is necessary to provide the phosphor layer 66 in a wider range than the light L-reflecting surface in the primary reflector 60.

Therefore, the irradiation device 10 of the present embodiment can reduce the area for providing the phosphor layer 66 as compared with the case of the reverse form. That is, the irradiation device 10 of the present embodiment can exert the first and second effects described above at a lower cost than the case of the reverse form.

Although the effects have been described by comparing the present embodiment with the reverse form, the reverse form can be said to have a configuration exhibiting the first to third effects (in the description of the third effect, the reflector body 64 is read as the secondary reflector 70). Therefore, it can be said that the reverse form described above also belongs to the technical scope of the present invention. In this case, the primary reflector 60 is an example of another reflector, and the secondary reflector 70 provided with the phosphor layer 66 is an example of a reflector.

The above is the description of the effect of the present embodiment.

As described above, the present embodiment has been described as an example of the present invention, but the present invention is not limited to the present embodiment. The technical scope of the present invention also includes, for example, the following forms (modification examples).

Figure 4:
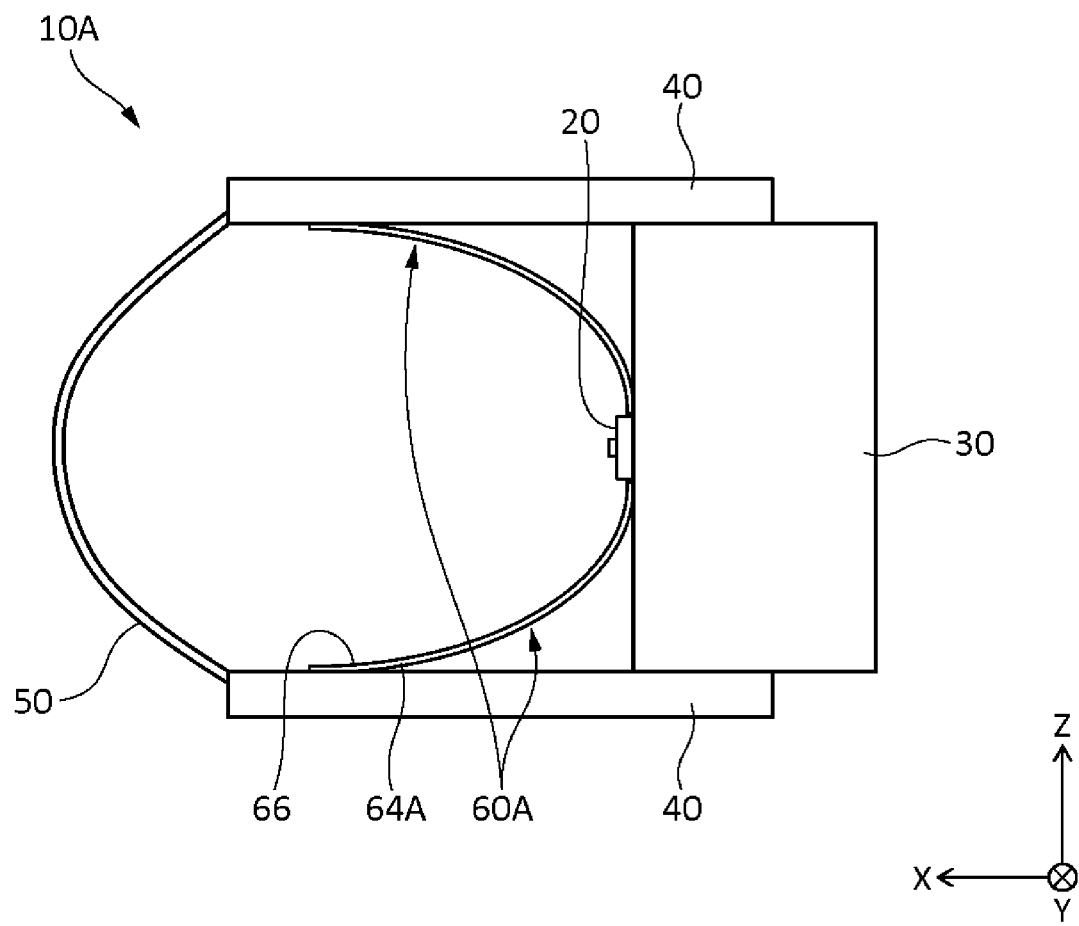
FIG. 4 shows a schematic view of an irradiation device of a first modification example.

For example, the irradiation device 10 of the present embodiment has been described as including the primary reflector 60 and the secondary reflector 70 as shown in FIGS. 1 and 3. However, for example, as in an irradiation device 10A of the first modification example shown in FIG. 4, the primary reflector 60 and the secondary reflector 70 may be replaced with a reflector 60A. In this case, the reflector 60A may include a reflector body 64A and the phosphor layer 66, and the phosphor layer 66 may be provided on the reflecting surface side of the light L in the reflector body 64A.

Further, the light source 20 of the present embodiment has been described as an LED light source as an example. However, the light source 20 may not have to be an LED light source as long as the light L emitted from the light source 20 can excite the phosphor contained in the phosphor layer 66.

Further, the irradiation device 10 of the present embodiment has been described as having a finisher 80 and a shade 90 as shown in FIGS. 1 and 3. However, one or both of the finisher 80 and the shade 90 are not essential components in the irradiation device of the present invention.

In addition, it has been described that, in the case of the present embodiment, the third effect of the present embodiment does not require the change in the layout of each component of the related art in order to achieve the first and second effects described above. Therefore, for example, the primary reflector 60 of the present embodiment may be used as a replacement part for the irradiation device of the related art. The same applies to the case of the reverse form and the case of the first modification example.

Figure 5:
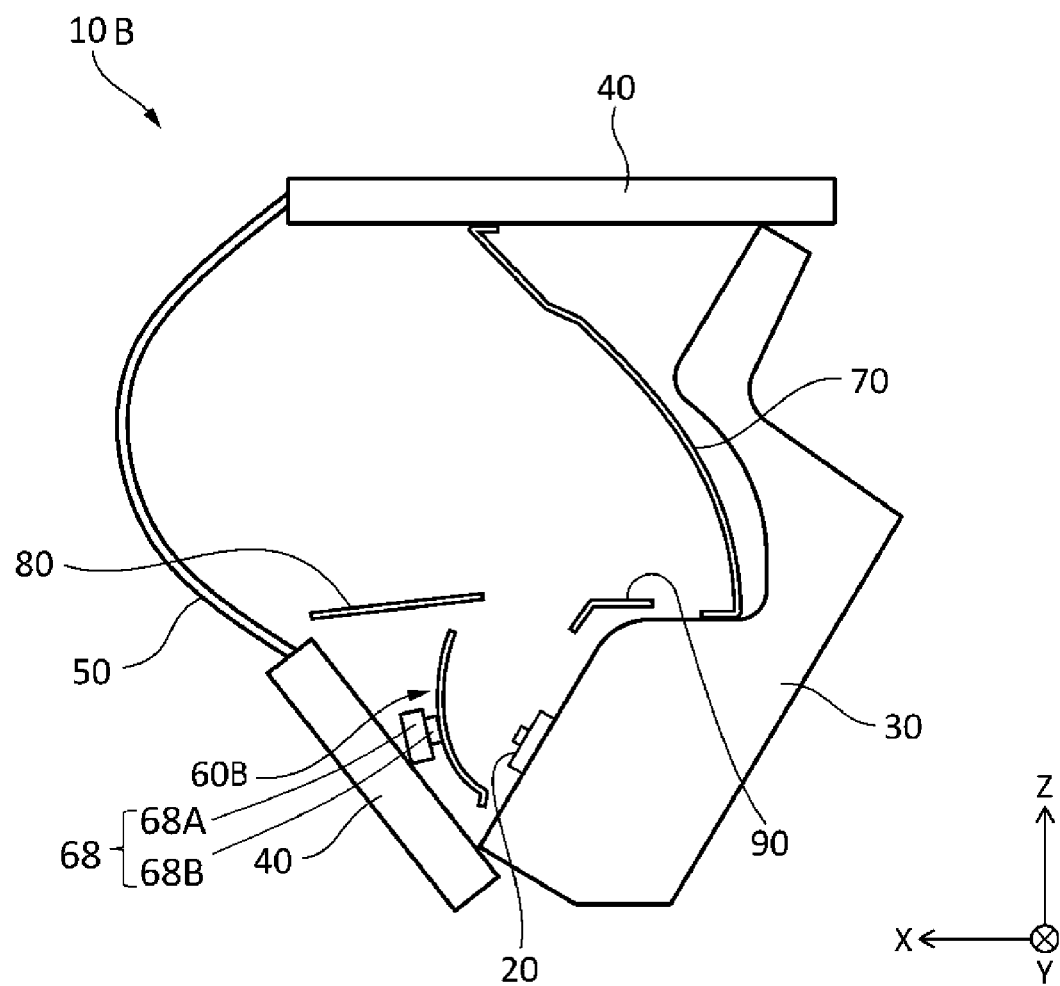
FIG. 5 shows a schematic view of an irradiation device of a second modification example.
Figure 6A:
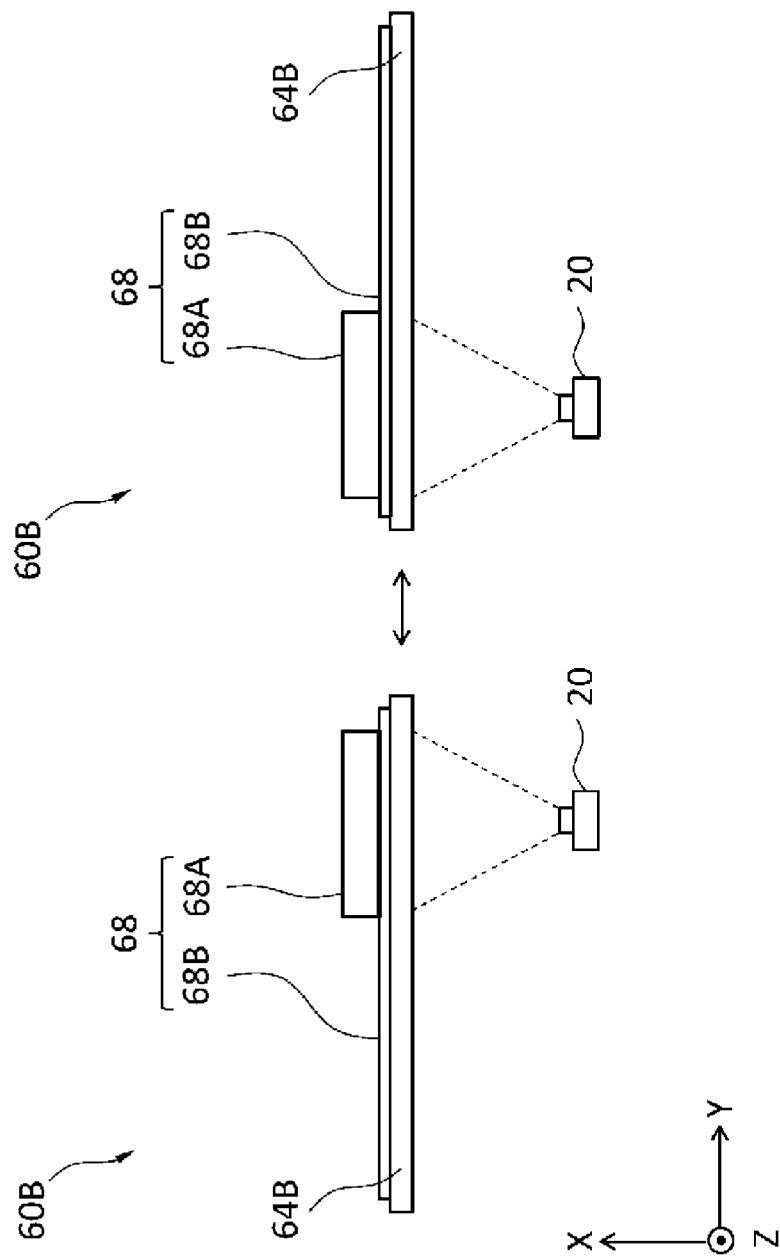
FIG. 6A shows a view of a primary reflector and a light source of the irradiation device of a second modification example as viewed from above in a height direction.
Figure 6B:
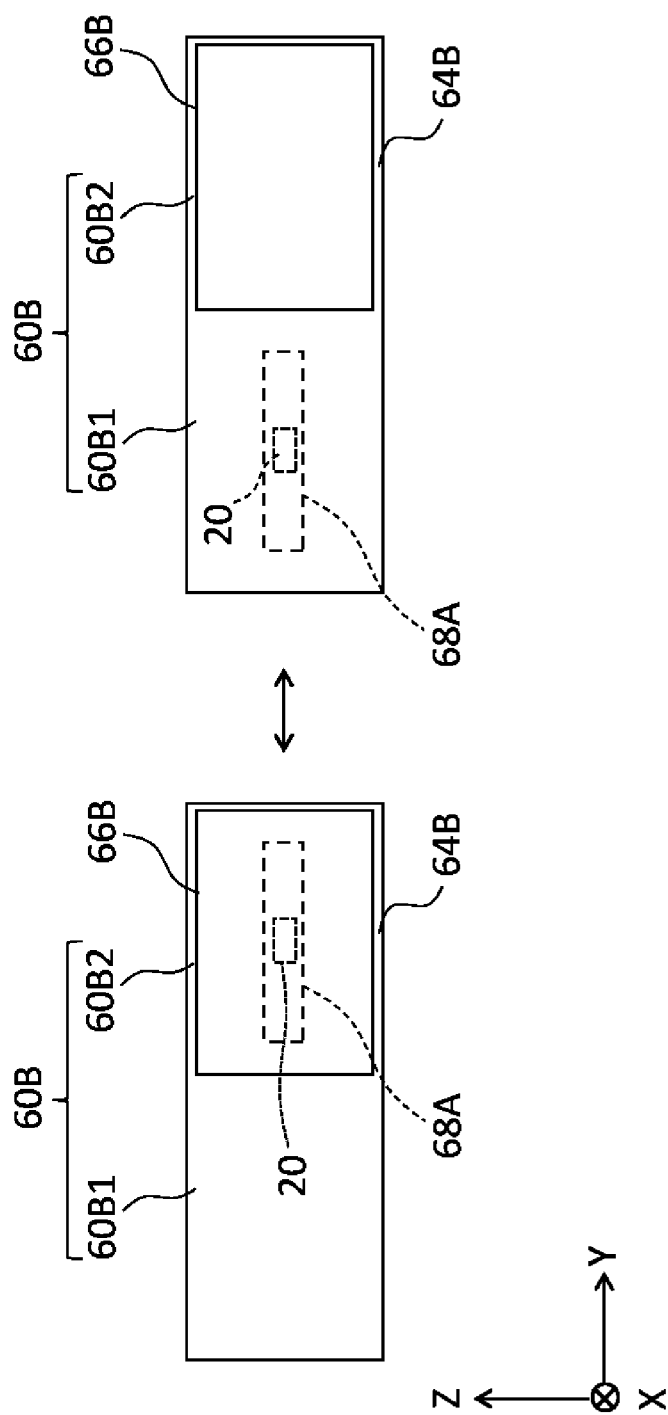
FIG. 6B shows a view of a primary reflector and the light source of the irradiation device of the second modification example as viewed from upstream side in an irradiation direction.

Further, in addition to the present embodiment and the above-described modification example, an irradiation device 10B of a second modification example shown in FIGS. 5, 6A, and 6B may be used.

Hereinafter, the differences from the irradiation device 10B of the present modification example and the present embodiment will be described.

<Differences in Configuration>

The differences from the present embodiment in the present modification example are as follows.

[Primary Reflector and Secondary Reflector]

As an example, the primary reflector 60B is a long body along a device width direction (Y direction) (see FIGS. 6A and 6B).

A portion on one side (left side in FIGS. 6A and 6B) of the primary reflector 60B in a longitudinal direction is a first reflector 60B1, and a portion on the other side (right side in FIGS. 6A and 6B) is a second reflector 60B2 (see FIG. 6B).

The first reflector 60B1 is configured of only a part of a reflector body 64B (an example of a reflecting body). That is, the reflecting surface of the first reflector 60B1 (an example of the first reflection portion) does not have a phosphor layer.

The second reflector 60B2 includes a remaining part of the reflector body 64B (a portion obtained by excluding a part of the reflector body 64B of the first reflector 60B1 from the reflector body 64B) and a phosphor layer 66B (an example of the second reflection portion). The phosphor layer 66B is a thin layer provided on the concave surface of the reflector body 64B, and covers a region on one side of the concave surface of the reflector body 64B in the longitudinal direction as an example (see FIGS. 6A and 6B). As described above, the second reflector 60B2 and the first reflector 60B1 have the reflector body 64B common to each other.

[Moving Portion]

An irradiation device 10B of the present modification example includes a moving portion 68 (see FIGS. 5 and 6A) in addition to the above-mentioned first reflector 60B1 and second reflector 60B2. The moving portion 68 has a function of moving the first reflector 60B1 and the second reflector 60B2. Specifically, the moving portion 68 is capable of switching between a first state in which one of the first reflector 60B1 and the second reflector 60B2 is disposed at the reflection position (as shown in FIG. 6A, refers to a position facing the light source 20) and the other is disposed at a non-reflection position different from the reflection position and a second state in which the one reflector is disposed at the non-reflection position and the other reflector is disposed at the reflection position. In the present modification example, for convenience, the state of the primary reflector 60B shown on the left side of FIGS. 6A and 6B will be described as the "first state", and the state of the primary reflector 60B shown on the right side will be described as the "second state". In the first state, the light source 20 is at a position facing the second reflector 60B2 (phosphor layer 66B). In the second state, the light source 20 is in a position facing the first reflector 60B1. As an example, the moving portion 68 of the present modification example has an LM guide (guide rail 68B fixed to the LM guide body 68A and the reflector body 64B) and a drive source (not shown in the drawings) for driving the LM guide body 68A, and is capable of moving the first reflector 60B1 and the second reflector 60B2 straight along the Y direction.

Operation and Effect of Present Modification Example

According to the present modification example, the moving portion 68 causes the reflector body 64B to reciprocate to switch the reflector disposed at the reflection position, that is, by switching between the first state and the second state, even in the same light source 20, it is possible to provide an irradiation device 10B capable of color conversion. For example, in a case where the phosphor layer 66B is a red-based phosphor layer, the irradiation device 10B can be used as a fog lamp by switching the reflector facing the light source 20 from the first reflector 60B1 (second state) having no phosphor layer to the second reflector 60B2 (first state) having the phosphor layer 66B.

Further, in a case where the irradiation device 10B is used as a headlamp of a vehicle, and in a case of a configuration in which the light L emitted from the light source 20 is converted into light having a longer wavelength (the wavelength is shifted) by the phosphor of the phosphor layer 66B, the follows are possible. That is, the irradiation device 10B in a state where the light L emitted from the light source 20 is reflected by the first reflector 60B1 having no phosphor layer may be used during normal time when no fog occurs in a traveling space of a vehicle (or even when fog occurs, the fog does not interfere with the view of a driver) and the irradiation device 10B in a state where the light L emitted from the light source 20 is reflected by the second reflector 60B2 having the phosphor layer 66B may be used during abnormal time when fog occurs in a traveling space of a vehicle (to the extent that the fog interferes the view of a driver).

In the case of this configuration, the light L emitted from the irradiation device 10B during abnormal time is effective against fog because a long wavelength component is added as compared with the case during normal time.

Other effects are the same as the effects of the present embodiment.

The above is the description of the second modification example, but the first reflector 60B1 and the second reflector 60B2 may have an opposite relationship (arrangement, presence or absence of phosphor layer 66B, or the like).

Further, as a modification example (third modification example) of the irradiation device 10B of the second modification example, the following irradiation device (not shown in the drawings) may be used. Specifically, the first reflector 60B1 of the second modification example includes a phosphor layer (an example of a first phosphor layer) containing a phosphor (an example of the first phosphor) having an emission peak wavelength different from the emission peak wavelength of the excitation light of the phosphor (an example of the second phosphor) of the phosphor layer 66B of the second reflector 60B2. In this case, the emission peak wavelength of the excitation light of the second phosphor is different from the emission peak wavelength of the excitation light of the first phosphor.

Operation and Effect of Present Modification Example

According to the present modification example, the moving portion 68 causes the reflector body 64B to reciprocate to switch the reflector disposed at the reflection position, thereby even in the same light source 20, it is possible to provide an irradiation device capable of color conversion.

Other effects are the same as the effects of present embodiment.

Figure 7A:
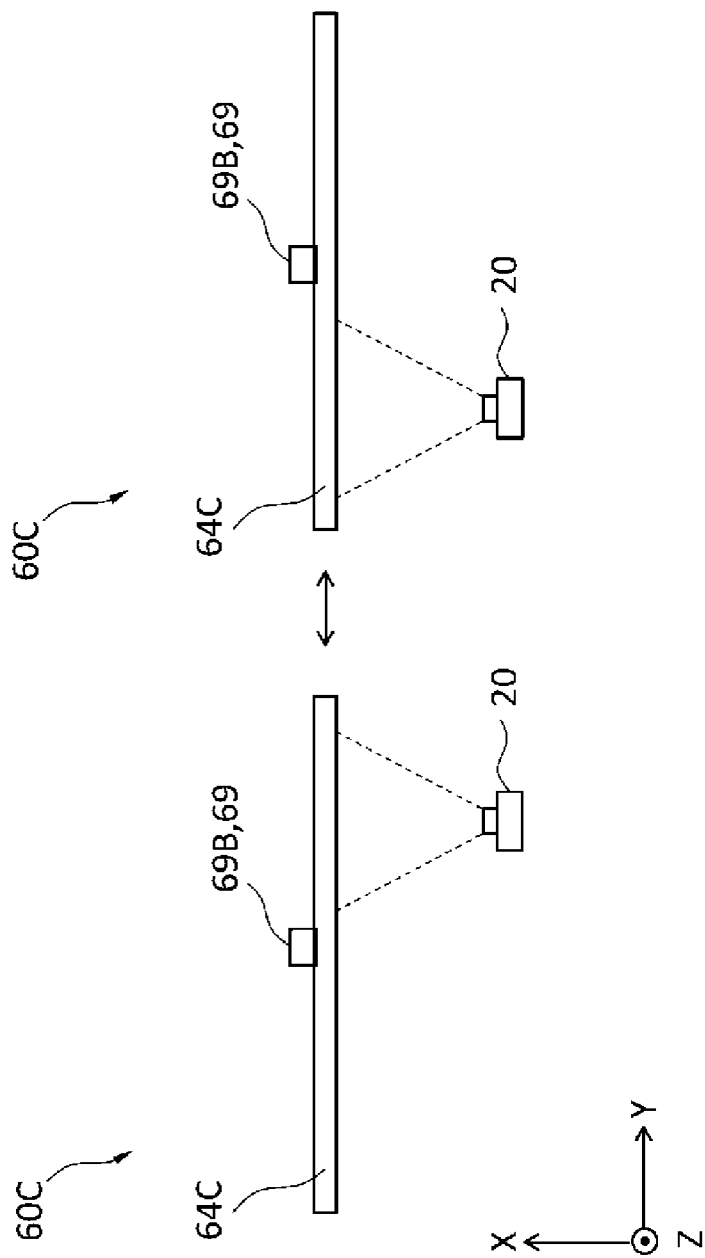
FIG. 7A shows a view of a primary reflector and a light source of the irradiation device of a fourth modification example as viewed from above in a height direction.

Further, as a modification example of the irradiation device 10B of the second modification example and the irradiation device of the third modification example, an irradiation device 10C of the fourth modification example of FIGS. 7A and 7B may be used.

Hereinafter, the differences from the second modification example in the irradiation device 10C of the present modification example will be described.

<Differences in Configuration>

The differences from the present modification example in the present modification example are as follows.

[Primary Reflector and Secondary Reflector]

As an example, the primary reflector 60C has a strip shape in which a portion on the central angle side of a fan shape is hollowed out in a circular shape (see FIGS. 7A and 7B).

One side (left side in the drawings) of the primary reflector 60C in the circumferential direction is the first reflector 60C1, and the other side (left side in the drawings) is the second reflector 60C2 (see FIG. 7B).

The first reflector 60C1 is configured of only a part of the reflector body 64C (an example of the reflecting body). That is, the reflecting surface of the first reflector 60C1 (an example of the first reflection portion) does not have a phosphor layer.

The second reflector 60C2 includes a remaining part of the reflector body 64C (a portion obtained by excluding a part of the reflector body 64C of a first reflector 60C1 from the reflector body 64C) and a phosphor layer 66C (an example of the second reflection portion). The phosphor layer 66C is a thin layer provided on the concave surface of the reflector body 64C, and covers a region on one side of the concave surface of the reflector body 64C in the longitudinal direction as an example (see FIG. 7B). As described above, the second reflector 60C2 and the first reflector 60C1 have a reflector body 64C common to each other.

[Moving Portion]

An irradiation device 10C of the present modification example includes a moving portion 69 (see FIGS. 7A and 7B) in addition to the above-mentioned first reflector 60C1 and second reflector 60C2. The moving portion 69 has a function of moving the first reflector 60C1 and the second reflector 60C2. Specifically, the moving portion 69 is capable of switching between a first state in which one of the first reflector 60C1 and the second reflector 60C2 is disposed at the reflection position (as shown in FIG. 7A, refers to a position facing the light source 20) and the other is disposed at a non-reflection position different from the reflection position and a second state in which the one reflector is disposed at the non-reflection position and the other reflector is disposed at the reflection position. As an example, the moving portion 69 of the present modification example includes a rotating shaft 69A, a connecting rod 69B connecting the rotating shaft 69A and the reflector body 64C, and a drive source (not shown in the drawings) for rotationally driving the rotating shaft 69A around the shaft, and drives the drive source to make it possible to rotate the reflector body 64C along the circumferential direction in which the first reflector 60C1 and the second reflector 60C2 are aligned.

Operation and Effect of Present Modification Example

According to the present modification example, the moving portion 69 causes the reflector body 64C to reciprocate to switch the reflector disposed at the reflection position, thereby even in the same light source 20, it is possible to provide an irradiation device 10C capable of color conversion. For example, in a case where the phosphor layer 66C is a red-based phosphor layer, the irradiation device 10C can be used as a fog lamp by switching the first reflector 60C1 having no phosphor layer to the second reflector 60C2 having the phosphor layer 66C.

Other effects are the same as the effects of present embodiment.

The above is the description of the third modification example, but the first reflector 60C1 and the second reflector 60C2 may have an opposite relationship (arrangement, presence or absence of phosphor layer 66C, or the like). Further, the present modification example may be further modified as in the fourth modification example.

Priority is claimed on Japanese Patent Application No. 2019-017775, filed on Feb. 4, 2019, the entire disclosure of which is incorporated herein.

REFERENCE SIGNS LIST

10: irradiation device
10A: irradiation device
10B: irradiation device
10C: irradiation device
20: light source
30: support base
40: housing
50: cover member
60: primary reflector (example of reflector or another reflector)
60A: reflector
60B: primary reflector (example of reflector or another reflector)
60B1: first reflector
60B2: second reflector
60C: primary reflector (example of reflector or another reflector)
60C1: first reflector
60C2: second reflector
62: concave surface
64: reflector body
64A: reflector body
64B: reflector body (example of reflecting body)
64C: reflector body (example of reflecting body)
66: phosphor layer
66B: phosphor layer
66C: phosphor layer
68: moving portion
68A: LM guide body
68B: guide rail
69: moving portion
69A: rotating shaft
69B: connecting rod
70: secondary reflector (example of another reflector or reflector)
80: finisher
90: shade
L: light

The invention claimed is:

1. An irradiation device comprising:
a light source;
a primary reflector that is at a predetermined reflection position and reflects light emitted from the light source, the primary reflector having a first reflector and a second reflector;
a secondary reflector that reflects the light emitted from the light source; and
a moving portion that moves the primary reflector and is capable of switching between a first state in which one of the first reflector and the second reflector is at the reflection position and the other is at a non-reflection position different from the reflection position and a second state in which the one reflector is at the non-reflection position and the other reflector is at the reflection position,
wherein the first reflector includes a first phosphor layer containing a first phosphor excited by the light emitted from the light source,
the second reflector includes a second phosphor layer containing a second phosphor which is excited by the light emitted from the light source and has an emission peak wavelength of excitation light different from an emission peak wavelength of excitation light of the first phosphor, and
the irradiation device is configured such that the light emitted from the light source propagates via both of a first path that extends from the light source via the primary reflector to the secondary reflector and a second path that directly extends from the light source to be reflected by the secondary reflector.

2. The irradiation device according to claim 1, wherein the first reflector includes a first reflection portion that reflects the light emitted from the light source, the second reflector includes a second reflection portion that reflects the light emitted from the light source, and the first reflection portion and the second reflection portion are each configured of different parts of a reflecting body that reflects the light emitted from the light source.

3. The irradiation device according to claim 2, wherein the first reflector and the second reflector are side by side by having reflecting surfaces formed on the same surface of the reflecting body, and the moving portion switches between the first state and the second state by causing the reflecting body to reciprocate along a linear direction in which the first reflector and the second reflector are aligned.

4. The irradiation device according to claim 2, wherein the first reflector and the second reflector are side by side by having reflecting surfaces formed on the same surface of the reflecting body, and the moving portion switches between the first state and the second state by rotating the reflecting body to reciprocate along a circumferential direction in which the first reflector and the second reflector are aligned.

5. An irradiation device comprising:
a light source;
a primary reflector that is at a predetermined reflection position and reflects light emitted from the light source, the primary reflector having a first reflector and a second reflector;
a secondary reflector that reflects the light emitted from the light source; and
a moving portion that moves the primary reflector and is capable of switching between a first state in which one of the first reflector and the second reflector is at the reflection position and the other is at a non-reflection position different from the reflection position and a second state in which the one reflector is at the non-reflection position and the other reflector is at the reflection position,
wherein only one of the first reflector and the second reflector includes a phosphor layer containing a phosphor excited by the light emitted from the light source, and
the irradiation device is configured such that the light emitted from the light source propagates via both of a first path that extends from the light source via the primary reflector to the secondary reflector and a second path that directly extends from the light source to be reflected by the secondary reflector.

6. An irradiation device comprising:
a light source;
a primary reflector that is at a predetermined reflection position and reflects light emitted from the light source, the primary reflector having a first reflector and a second reflector;
a secondary reflector that reflects the light emitted from the light source; and
a moving portion that moves the primary reflector and is capable of switching between a first state in which one of the first reflector and the second reflector is at the reflection position and the other is at a non-reflection position different from the reflection position and a second state in which the one reflector is at the non-reflection position and the other reflector is at the reflection position,
wherein only one of the first reflector and the second reflector includes a phosphor layer containing a phosphor excited by the light emitted from the light source,
one of the first reflector and the second reflector includes the phosphor layer containing a phosphor excited by the light emitted from the light source to thereby reflect the light emitted from the light source by shifting a wavelength of the light to a wavelength on a wavelength side of a light emission color of the phosphor,
the other of the first reflector and the second reflector reflects the light emitted from the light source without shifting a wavelength of the light, and
the irradiation device is configured such that the light emitted from the light source propagates via both of a first path that extends from the light source via the primary reflector to the secondary reflector and a second path that directly extends from the light source to be reflected by the secondary reflector.

7. The irradiation device according to claim 6, wherein the phosphor shifts the wavelength of the light emitted from the light source to a wavelength longer than the wavelength of the light.

8. The irradiation device according to claim 7, wherein the irradiation device is used as a headlamp of a vehicle,
in the first state, one, which has the phosphor layer, the first reflector and the second reflector is at the non-reflection position,
in the second state, one, which has the phosphor layer, the first reflector and the second reflector is at the reflection position,
the first state is used during normal time when no fog occurs in a traveling space, and
the second state is used during abnormal time when fog occurs in a traveling space.

\* \* \* \* \*